(12) United States Patent
Zou

(10) Patent No.: US 8,985,151 B1
(45) Date of Patent: Mar. 24, 2015

(54) MULTI-STREAM ROTARY FLUID DISTRIBUTION SYSTEM

(71) Applicant: Baisheng Zou, Pearland, TX (US)

(72) Inventor: Baisheng Zou, Pearland, TX (US)

(*) Notice: Subject to any disclaimer, the term of this patent is extended or adjusted under 35 U.S.C. 154(b) by 313 days.

(21) Appl. No.: 13/623,974

(22) Filed: Sep. 21, 2012

Related U.S. Application Data

(60) Provisional application No. 61/537,434, filed on Sep. 21, 2011, provisional application No. 61/566,676, filed on Dec. 4, 2011.

(51) Int. Cl.
*F16K 11/00* (2006.01)

(52) U.S. Cl.
CPC .................................... *F16K 11/00* (2013.01)
USPC ................. 137/874; 137/625.19; 137/625.46; 137/625.47; 137/594; 137/580; 165/7; 165/8

(58) Field of Classification Search
CPC ........................................................ F16K 11/00
USPC .......... 137/580, 594, 625.19, 625.46, 625.47, 137/874; 165/7, 8
See application file for complete search history.

(56) References Cited

U.S. PATENT DOCUMENTS

| | | | |
|---|---|---|---|
| 3,077,926 A * | 2/1963 | Fikenscher | 165/7 |
| 3,706,812 A | 12/1972 | de Rosset et al. | |
| 4,310,046 A * | 1/1982 | Michalak | 165/5 |
| 4,372,337 A * | 2/1983 | Holzenberger | 137/240 |
| 4,397,335 A * | 8/1983 | Doblar et al. | 137/625.19 |
| 5,335,497 A | 8/1994 | Macomber | |
| 5,503,222 A * | 4/1996 | Dunne | 165/104.12 |
| 5,664,620 A | 9/1997 | Ritter | |
| 5,871,347 A | 2/1999 | Chen et al. | |
| 5,967,771 A | 10/1999 | Chen et al. | |
| 6,000,430 A * | 12/1999 | Nafz | 137/625.11 |
| 6,155,334 A * | 12/2000 | Steele | 165/8 |
| 6,193,504 B1 | 2/2001 | Chen et al. | |
| 6,422,299 B1 * | 7/2002 | Eriksson | 165/8 |
| 6,675,871 B2 | 1/2004 | Okano et al. | |
| 7,141,172 B2 | 11/2006 | Wang et al. | |
| 7,284,373 B1 | 10/2007 | Benson | |
| 7,762,808 B2 | 7/2010 | Lee et al. | |
| 7,874,175 B2 | 1/2011 | Graf | |
| 7,937,939 B2 | 5/2011 | Benson | |

* cited by examiner

*Primary Examiner* — John K Fristoe, Jr.
*Assistant Examiner* — Christopher Ballman
(74) *Attorney, Agent, or Firm* — Egbert Law Offices, PLLC

(57) ABSTRACT

A rotary fluid distribution apparatus has a first head with a wall extending around an interior volume thereof, and having a first orifice and a second orifice formed through the wall so as to open to the interior volume, a rotor extending through the interior volume, a first separation plate positioned within the first head and having an opening formed therethrough, a second separation plate positioned within the first head in spaced relation to the first separation plate and having a first opening and a second opening formed therein, and a tunneling channel extending between the first and second separation plates so as to communicate with the opening of the first separation plate and with the first opening of the second separation plate. The tunneling channel is movable with a rotation of the rotor.

21 Claims, 17 Drawing Sheets

MULTI-STREAM ROTARY FLUID DISTRIBUTION SYSTEM

CROSS-REFERENCE TO RELATED APPLICATIONS

The present application claims priority from U.S. Provisional Patent Application Ser. No. 61/566,676, filed on Dec. 4, 2011, and entitled "Multi-Stream Rotary Fluid Distribution System And Device". The present application also claims priority from U.S. Provisional Patent Application Ser. No. 61/537,434, filed on Sep. 21, 2011, and entitled "Rotary Fluid Distribution".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of rotary fluid distribution. More particularly, the present invention relates to rotors which can be used to distribute fluid in regenerative heat exchangers, rotary air dehumidifiers, regenerative thermal oxidizers and simulated or real moving bed devices.

2. Description of Related Art Including Information Disclosed Under 37 CFR 1.97 and 37 CFR 1.98.

The main bodies of certain classes of process equipment need to be regenerated or renewed after a certain time period of operation. This equipment can include regenerative heat exchangers, regenerative thermal oxidizers, moving bed (simulated or real) chemical reactors/chromatographic separators, pressure swing absorption columns and regenerative air dehumidifiers. The regeneration methods include rotating the main body of the equipment or switching on and off a multitude of valves so that different sections of the main body can be contacted by different kinds of fluids at different times. The present invention attempts to alleviate the problems associated with switching on and off the multitude of valves, and to simplify rotary mechanisms of rotary valves.

Heat exchangers with rotating bodies, commonly known as Ljungstrom air preheaters, are well known in the prior art. In these types of rotary regenerators, the body (matrix) rotates continuously with the constant fraction of the core and the hot fluid stream in one section and the remaining fraction in the cold fluid stream. The outlet fluid temperatures vary across the flow area and are independent of time. The two fluids generally flow in opposite directions and are separated by some form of duct work and seals on the matrix body.

Heat exchangers with rotating hoods, or Rothemuhle regenerators, are also commonly known. The heating plate elements in this type of regenerative air preheater are installed in a casing, but the heating plate elements are stationary rather than rotating. Instead, the air ducts in the preheater are rotated so as to alternatively expose sections of the heating plate elements to the up flowing cool air. There are rotating inlet air ducts at the bottom of the stationary plate similar to the rotating outlet air ducts at the top of the stationary plates.

Rotary dehumidifiers are also commonly used. Instead of the exchange of heat or energy, a rotary dehumidifier exchanges molecules of two streams via a rotating body of desiccant or a molecular sieve.

Various patents have issued in the past relating to regenerative heat exchangers, heat engines, and regenerative thermal oxidizers. For example, U.S. Pat. No. 5,664,620, issued on Sep. 9, 1997 to Ritter, describes a rotary regenerative heat exchanger. The rotor of the rotary regenerative air preheater is constructed for the loading of the heat exchange basket modules into the sectors of the rotor in a radial direction through the periphery of the rotor. The heat exchange basket modules are arranged in a plurality of axially spaced layers with the lower baskets supporting the baskets located above. To provide the support and to facilitate the loading of the baskets, each basket includes an integral grating structure at the top surface thereof which extends partially above the uppermost surface of the basket frame. This provides a clear sliding surface as well as a support for the baskets in the layer above.

U.S. Pat. No. 6,675,871, issued on Jan. 13, 2004 to Okano et al., teaches a heat exchanger. The heat exchanger includes a honeycomb rotor, a drive unit and a gas movement device. The honeycomb rotor has at least two heat exchange passages and at least two purge zones provided respectively between the heat exchange passages. The drive unit rotates the honeycomb rotor. The gas movement device circulates a gas through the purge zones. The gas movement device may include a blower, and the drive unit may include a motor. In this case rotation of the blower can be synchronized with rotation of the motor. A drive device includes a power source that emits exhaust gas. The power source has a fuel battery having an air intake. Heat may be exchanged between the exhaust gas and air supplied to the air intake.

U.S. Pat. No. 5,335,497, issued on Aug. 9, 1994 to Macomber, describes a rotary Stirling cycle engine. The rotary Stirling cycle engine has a pair of hollow chambers each having an elliptical rotor positioned inside and rotatably sealed to the chambers inner walls. A crankshaft connects the rotors in tandem to transmit rotational energy when the rotors revolve around the chambers. A cooling and a heating heat exchanger are each connected through ports in the chambers sidewalls one to the other. Working fluid is present at a constant volume within the chambers and heat exchangers, revolving the rotors as the volume in each chamber changes due to the cyclic expansion, and contraction of the working fluid as it sweeps around the chambers through the ports while being alternately heated and cooled by the heat exchangers.

U.S. Pat. No. 7,874,175, issued on Jan. 25, 2011 to Graf, describes a heat engine and heat pump using centrifugal fans. The device comprises two doubly connected chambers. Blades in each chamber substantially rotate with the chamber and may be firmly attached to the walls of the chamber, thus forming a modified centrifugal pump with axial input and discharge. An expandable fluid is rotated outward by one of the pumps and then heat is added for an engine or removed for a heat pump as the fluid is being sent to the outer part of the second pump. The fluid travels toward the center of the second pump, thus impelling the pump in the rotation direction. Then heat is removed for an engine or added for a heat pump as the fluid leaves the second pump and travels back to the first pump near the center of rotation of both pumps. Rotation energy of the fluid is typically much larger than the circulation energy. A modified centrifugal pump with axial discharge having a casing rotating with the blades is also claimed.

U.S. Pat. No. 3,706,812, issued on Dec. 19, 1972 to Armand J. de Rosset et al., describes a rotary valve for distributing fluids to multitude of adsorption columns. This type of device allowed first generation of simulated moving bed to become operational.

U.S. Pat. No. 7,284,373, issued on Oct. 23, 2007 to Benson, describes a thermodynamic cycle engine. The thermodynamic cycle heat engine has a regenerator housing with two bidirectional regenerators, compression and expansion chambers connected to different ends of the housing, and a gear train. Each of the bi-directional regenerators comprises a low pressure connection having a first volume and a high pressure connection having a second volume less than the first volume. The bi-directional regenerators, the compression chamber, and the expansion chamber form a closed space for a working fluid. The gear train is disposed within the regenerator housing and comprises a plurality of non-round gears, a center gear group, and two outer gear groups substantially opposed with respect to the center gear group. The gear train oscillatingly rotates rotors in the chambers to create cyclically varying volumes for compression and expansion spaces so that two thermodynamic cycles are completed by the engine for each rotation of the rotors.

U.S. Pat. No. 7,937,939, issued on May 10, 2011, also to Benson, describes a bicycle thermodynamic engine. The thermodynamic cycle heat engine includes a regenerator, a chamber in fluid communication with the regenerator, first and second rotors within the chamber, forming at least a pair of spaces within the chamber, and at least one actuator. The regenerator and the chamber form a portion of a closed space for a working fluid, the actuator is arranged to displace the rotors about an axis of rotation for the rotors, and at least a portion of the actuator is fixedly secured to the rotors. In some aspects, the actuator is arranged to receive energy from the rotors and operate as a generator, or a sensor is arranged to detect a condition associated with operation of the chamber and a controller is arranged to control the actuator responsive to the detected condition. In some aspects, the engine includes a heat exchanger in fluid communication between the regenerator and the chamber.

U.S. Pat. No. 7,141,712, issued on Nov. 28, 2006 to Wang et al., summarizes various valve options for simulated moving bed chromatography technology. Both single rotary valves and distributed valve systems were described.

U.S. Pat. No. 5,967,771, issued on Oct. 19, 1999 to Chen et al., describes a rotary regenerative oxidizer and system thereof. The system for the abatement of industrial process gases utilizes a rotary regenerative oxidizer comprised of one or more heat exchange beds, each bed comprised of a parallel, axial, and longitudinal array of heat regenerative channels that thermally and/or catalytically oxidize contaminated gases. Utilizing a rotary regenerative oxidizer, and if desired, a plurality of heat regenerative beds incorporated therein, facilitates the use of regenerative technology at lower gas flow rates, increases thermal efficiency, and significantly reduces the floor space normally required when implementing fixed-bed nonrotary regenerative oxidizers. The heat exchange channels may be catalytically treated to enhance oxidation of the pollutants at a lower temperature. U.S. Pat. No. 5,871,347, issued on Feb. 16, 1999 also to Chen et al., describes a similar rotary regenerative oxidizer.

U.S. Pat. No. 6,193,504, issued on Feb. 27, 2001 also to Chen et al., teaches a portable rotary catalytic oxidizer system. The rotary regenerative catalytic oxidizer catalytically destroys VOC and odorous compounds at elevated temperatures of 400 to 800° F. Equipped with a very high thermally efficient rotor of 90+%, most heat for reaction is retained in the apparatus, and the cleaned air at temperatures of 80 to 120° F. is safely discharged into room without causing discomfort. As a portable unit, it can be used to treat local areas where odorous and/or hazardous VOC and CO compounds are present and conveniently run off household 120V or 220V systems.

U.S. Pat. No. 7,762,808, issued on Jul. 27, 2010 to Lee et al., also describes a regenerative thermal oxidizer. The regenerative thermal oxidizer burns and eliminates harmful process gases generated in industrial sites. The apparatus has different parts of the rotor that are used as inlet and outlet process gas flowpaths to increase the ability to process the process gases.

It is an object of the present invention to provide a rotary fluid distributor which allows a pair of rotors to accomplish the task which previously required multiple valves.

It is another object of the present invention to provide rotary fluid distributors which achieve greater productivity.

It is another object of the present invention to provide rotary fluid distributors that allow the direction of the fluid introduced into a heat exchanger to be altered, rather than rotation of the heat absorbing material therein.

It is another object of the present invention to provide a rotary fluid distributor that can be used in simulated moving bed chromatography.

It is another object of the present invention to provide a rotary fluid distributor having a pair of synchronized rotors.

It is a further object of the present invention to provide a fluid distributor rotor that eliminates the need to rotate the main body of regenerative equipment.

It is another object of the present invention to provide a rotary fluid distributor that can be easily installed and maintained.

These and other objects and advantages of the present invention will become apparent from a reading of the attached specification and appended claims.

BRIEF SUMMARY OF THE INVENTION

The present invention is a rotary fluid distribution apparatus that comprises a first head having a wall extending around an interior volume thereof and having a first orifice formed through the wall so as to open to the interior volume and a second orifice formed through the wall so as to open to the interior volume. The head has a first flowpath and a second flowpath opening to said interior volume. A rotor extends through the interior volume. A first separation plate is positioned within the first head. The first separation plate has an opening formed therethrough so as to define a first fluid section and a second fluid section within the head. A second separation plate is positioned with the head in spaced relation to the first separation plate. The second separation plate has a first opening and a second opening formed therein. A tunneling channel extends across the second fluid section and is in communication with the opening of the first separation plate. The tunneling channel is movable relative to a rotation of the rotor.

In the present invention, the tunneling channel is movable between a first position in which the tunneling channel communicates between the opening of the first separation plate and with the first flowpath of the head and a second position in which the tunneling channel communicates between the opening of the first separation plate and second flowpath of the head. The first fluid section is in communication with the first orifice of the head. The second fluid section is in communication with the second orifice of the head. The tunneling channel has a radius less than a radius of the first separation plate. A third separation plate can be positioned in the head on a side of the first separation plate opposite the second separation plate. The first separation plate and third separation plate define the first fluid section. The first separation plate and the second separation plate define the second fluid section.

A purge section can be positioned in the first head on a side of the second separation plate opposite the second fluid section. The purge section has at least one hole opening on a side thereof opposite the second separation plate.

In one embodiment of the present invention, the tunneling channel has a generally semi-cylindrical shape with a radius less than a radius of the first separation plate. In another embodiment of the present invention, the tunneling channel can be a pipe having an interior passageway with a diameter generally equal to a diameter of the opening of the first separation plate.

A center body is positioned at an end of the first head. The center body communicates at a different location with the first flowpath and the second flowpath of the head. The first head is affixed to one side of the center body. The center body is maintained in a stationary position. The center body has a plurality of sections formed therein. The rotor is rotatable to a position such that a first stream of a fluid flows to at least one of the plurality of sections of the center body and that a second stream of another fluid flow through at least through another one of the plurality of sections. The rotor is rotatable to another position such that the first stream of the fluid flows through the at least another one of the plurality of sections and such that the second stream of the another fluid flows through the at least one of the plurality of sections. The center body has a generally cylindrical configuration. The plurality of sections are defined by a plurality of walls radiating from a center of the center body toward a wall of the body. The rotor has a portion extending through the center body. The rotor is rotatable independently of the center body.

A second head is positioned on a side of the center body opposite the first head. The rotor extends through the center body and the second head. The second head has an interior volume. The second head has a first orifice and a second orifice opening through a wall thereof to the interior volume. The second head also has a first flowpath and a second flowpath opening to the interior volume of the head. A third separation plate is positioned in the second head. This third separation plate has an opening formed therein. The third separation plate defines a first fluid section and a second fluid section in the second head. A fourth separation plate is positioned within the second head in spaced relation to the third separation plate. The fourth separation plate has a first opening and a second opening formed therein. Another tunneling channel extends across the second fluid section of the second head and in communication with the opening of the third separation plate and with the first opening of the fourth separation plate. This another tunneling channel is movable with a rotation of the rotor.

The center body communicates at different locations with the first flowpath of the second head and with the second flowpath of the second head.

In the present invention, the rotor is rotatable to a first position in which the first fluid stream enters the first orifice and flows through the tunneling channel into the at least one section of the plurality of sections of the center body and flows from the center body through the another tunneling channel of the second head and outwardly of the first orifice of the second head. A second fluid stream enters the second orifice of the second head and flows around the another tunneling channel so as to pass into the another section of the plurality of sections of the center body and outwardly through the second orifice of the first head.

The rotor is rotatable to a second position in which the second fluid stream enters the first orifice of the first head so as to flow around the tunneling channel so as to flow into at least another one section of the plurality of sections of the center body. The second fluid stream passes outwardly of the third passage of the center body through the another tunneling channel of the second head and outwardly through the first orifice of the second head. The second fluid stream enters the second orifice of the second head when the rotor is in the second position so as to flow around the another tunneling channel so as to flow into the at least one section of the plurality of section. The second fluid stream passes outwardly of the center body so as to flow outwardly through the second orifice of the first head.

A driving means can be utilized for rotating the rotor between a first position and a second position. The rotor has a first portion extending through the first head and a second portion extending through the center body and a third portion extending through the second head. The first portion, the second portion and the third portion are in axial alignment. The first and third portions being synchronized by the connection of the second portion or by other electro-mechanical means, such that the first and third portions are always offset by a fixed circumferential distance from each other during rotation of the first, second and third portions.

One embodiment of the present invention is a rotary fluid distribution apparatus having a head having a wall extending around an interior volume thereof. The head having fixed fluid inlets and fixed fluid outlets. A rotor extends through the interior volume and has an end surface adjacent the fixed fluid inlets and fixed fluid outlets. The rotor has a plurality of fluid sections in a stacked configuration. A first fluid section of the plurality of fluid sections is formed adjacent the end surface of said rotor. A second fluid section of the plurality of fluid sections is formed adjacent the first fluid section opposite the end plate. A third fluid section of the plurality of fluid sections is formed adjacent the second fluid section opposite the first fluid section. A plurality of tunneling channels are formed within the rotor. A first tunneling channel opens at a first end through the end surface to one of the fixed fluid inlets and the fixed fluid outlets and opens at a second end to the first fluid section of the plurality of fluid sections. A second tunneling channel opens at a first end through the end surface to another of the fixed fluid inlets and fixed fluid outlets and opens at a second end to the second fluid section. A third tunneling channel of the plurality of tunneling channels opens at a first end through the end surface to yet another of the fixed fluid inlets and fixed fluid outlets and opens at a second end to the third fluid section. The rotor is rotatable such that one of the tunneling channels opens to a different fixed fluid inlet or fixed fluid outlet.

This foregoing section is intended to describe, with particularity, the preferred embodiment of the present invention. It is understood that modifications and changes to this preferred embodiment can be made within the concept of the present invention. As such, this section should not be construed, in any way, as limiting of the scope of the present invention. The present invention should only be limited by the following claims and their legal equivalents.

DETAILED DESCRIPTION OF THE INVENTION

Figure 1:
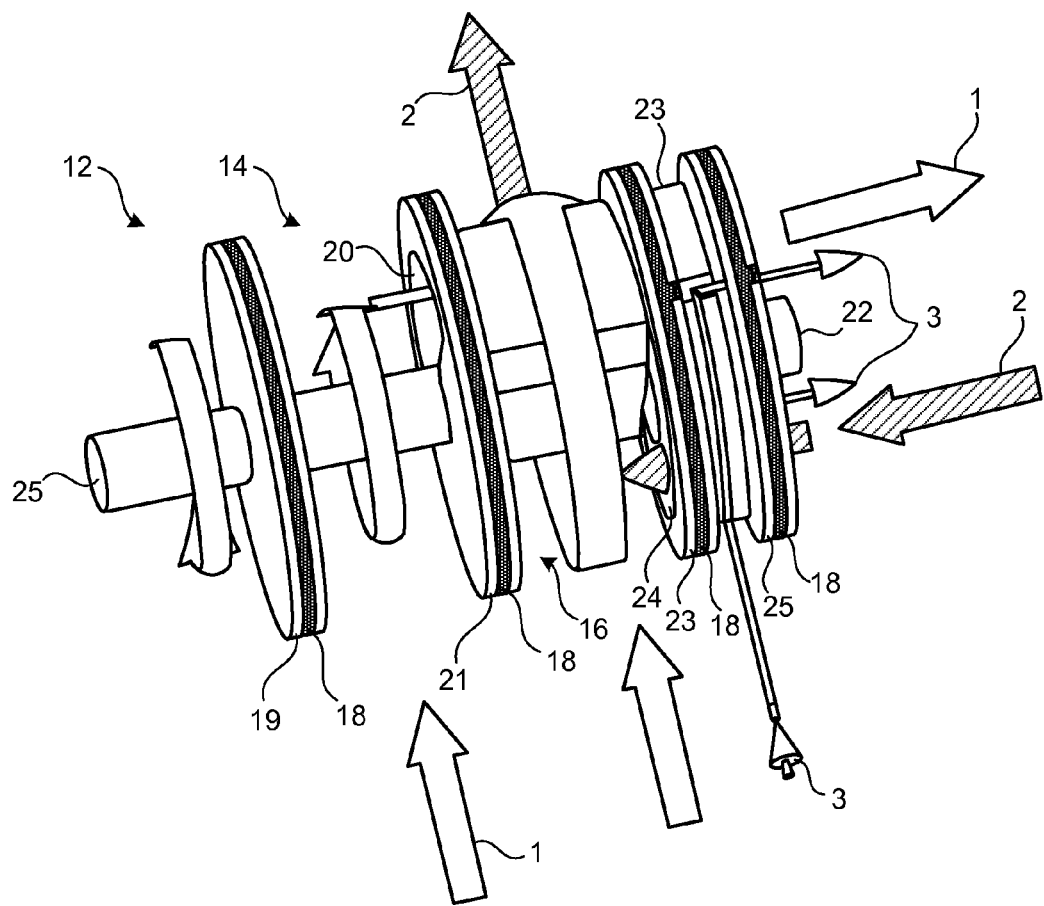
FIG. 1 is a perspective view of the rotor of the first embodiment of the present invention.

Referring to FIG. 1, there is shown the interior 12 of the first head of the regenerative equipment of the first embodiment of the present invention. While the arrangements used in the various embodiments of the present invention differ slightly, the general principle remains the same.

The interior 12 of the first head has a first fluid section 14 and a second fluid section 16. The first fluid section 14 and the second fluid section 16 are separated by a first separation plate 19. Sealing mechanisms 18, such as O-rings, are present on the separation plates and serve to seal the rotor chamber against the head of the apparatus. Second separation plate 21, third separation plate 23 and fourth separation plate 25 are also shown in FIG. 1.

When a fluid stream 1 enters through a first orifice in a wall of the first head, it will enter the first fluid section 14 of the interior 12 of the first head. The fluid is routed through the tunneling channel 20. The tunneling channel 20 allows the fluid to enter the first section 14 and bypass the second fluid section 16. The fluid entering the first section 14 then exits head through a first flowpath as stream 1.

Fluid stream 2 exits the second section 16 through a second orifice formed through a wall of the head. The fluid stream 2 comes from the opening 24 and flows through the open space of second fluid section 16. The fluid exiting second section 16 thus passes the second flowpath and passes around the tunneling channel 20 without interaction with the fluid in section 14. The two fluids exit or enter the rotor on opposite sides of the separation plate 19.

The configuration of the head allows the source nozzles (i.e. flowpaths) of the fluid entering/exiting the respective fluid sections 14 and 16 to remain stationary, while the direction of fluid is controlled by the rotor 25. The outer wall of tunneling channel 20 does not extend to the edge of the separation plates 19. This allows fluid exiting/entering the side of the second fluid section 16 adjacent the tunneling channel 20 to move around the outer wall of tunneling channel 20 and exit as stream 2, regardless of the rotational position of the rotor 25. An optional purge stream 3 enters a third section 23 and passes through a hole in the separation plate and enters the center body of the equipment. Also shown in FIG. 1 is the connection socket 22. The connection socket 22 is present on both of the rotors used in the present invention, and allows for connection of the connection rod 44 which is shown in subsequent figures. The rotational power is transmitted by the rotor 25. As the rotor rotates, different fluids are alternatively distributed to different parts of the center body of the equipment.

Figure 2:
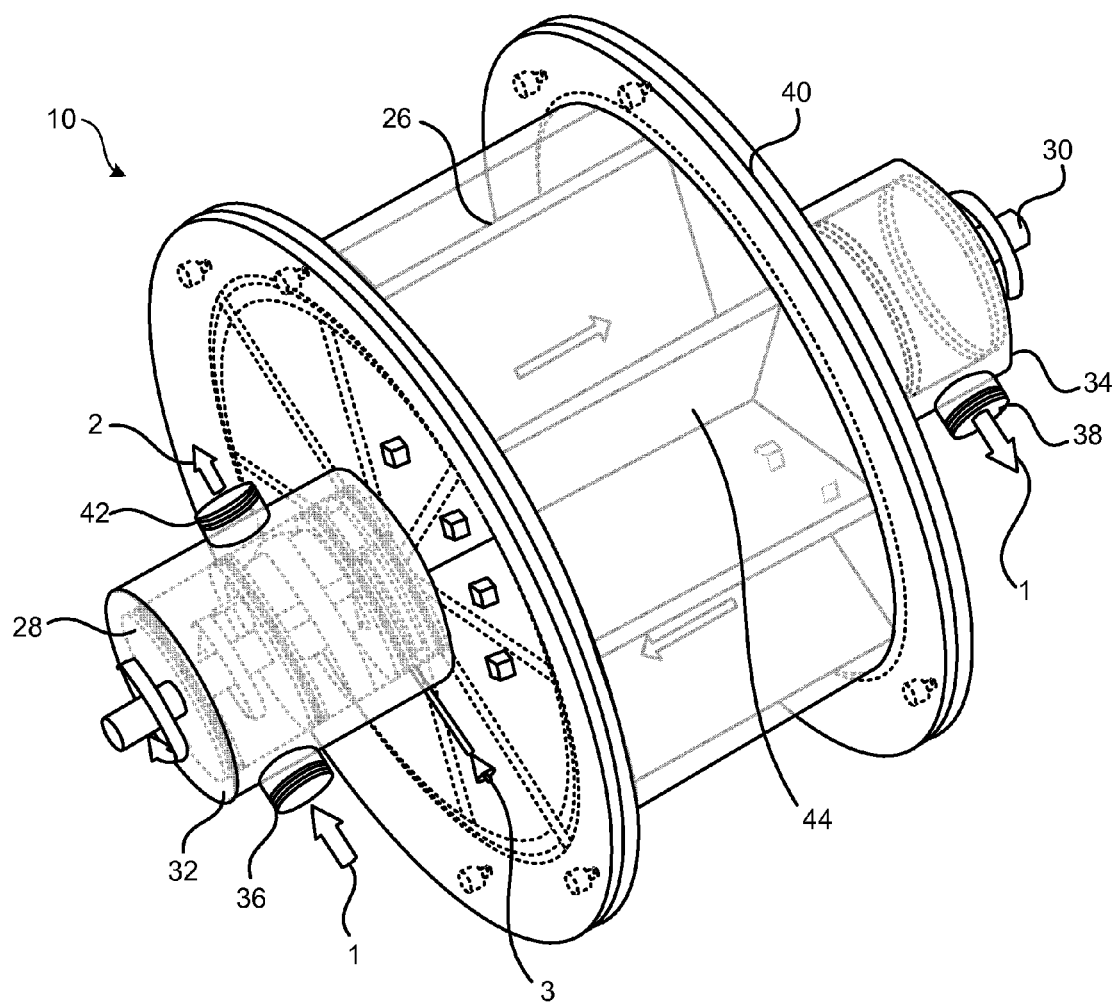
FIG. 2 is a schematic view, partially transparent, of the regenerative equipment of the first embodiment of the present invention.

Referring to FIG. 2, there is shown a schematic view, partially transparent, of the regenerative equipment 10 of the first embodiment of the present invention. In the first embodiment of the present invention, the regenerative equipment 10 utilizes synchronized two rotors. In FIG. 2, it can be seen that there is a rotor 28 contained within a first head 32. Similarly, there is another rotor 30 contained within second head 34. The rotor 28 and rotor 30 are connected via connection rod 44 which extends through the center body 26 of the regenerative equipment 10 of the present invention. The connection rod 44 synchronizes the rotation of the rotor 28 and rotor 30.

FIG. 2 also shows the flowpaths of the fluids introduced and exiting from the regenerative equipment 10 of the present invention. In FIG. 2, it can be seen how stream 1 enters the regenerative equipment 10 at the stream 1 inlet 36 adjacent the rotor 28. The stream 1 exits the equipment 10 at the outlet 38 adjacent the rotor 30. Stream 2 enters through a stream 2 inlet 40 (not shown) adjacent the rotor 30 and exits at stream 2 outlet 42 adjacent the rotor 28. The optional purge stream 3 is also shown.

The center body 26 contains a number of sections through which the various fluids can pass. Importantly, when the rotors are rotated, the inlets and outlets of the fluids (i.e. stream 1 with inlet/outlet 36/38 and stream 2 with inlet/outlet 40/42) can remain the same, while the direction of the fluids, in terms of which center body section each fluid could enter, is controlled by the rotors.

Figure 3:
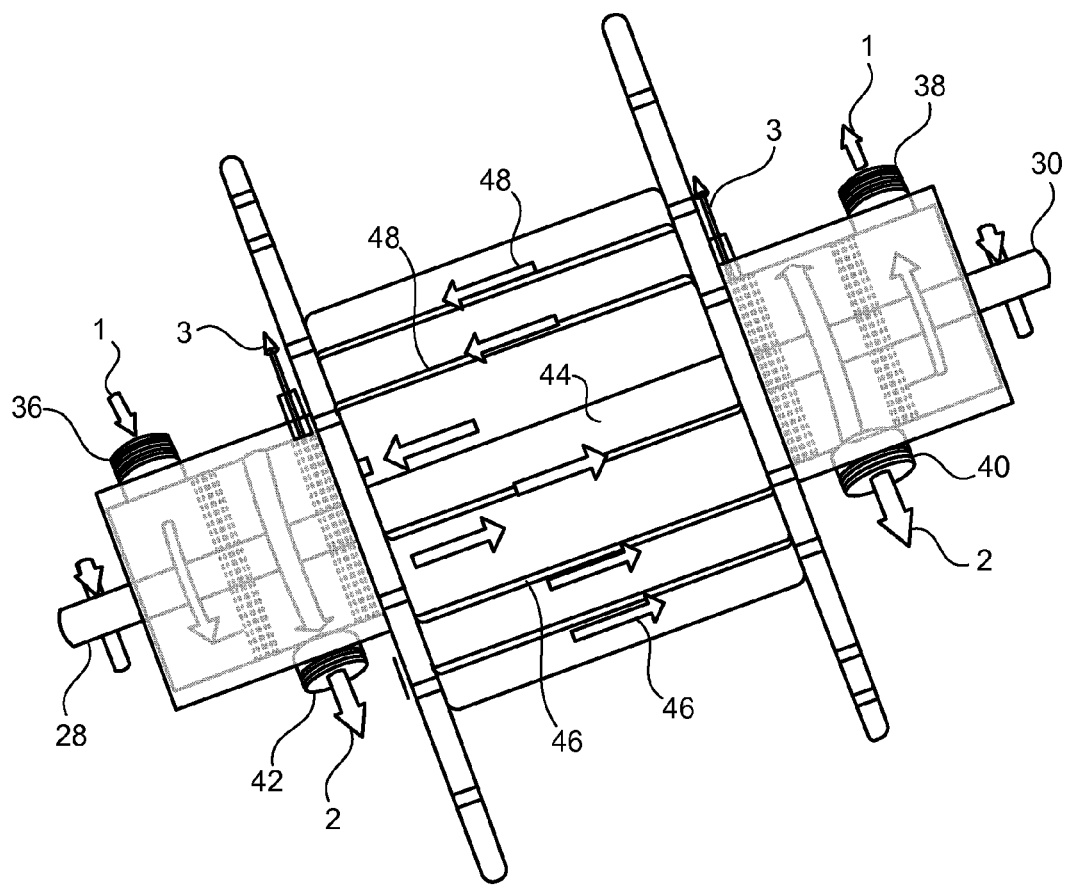
FIG. 3 is a second schematic view showing the flowpath of the regenerative equipment of the first embodiment of the present invention.

Referring to FIG. 3, the flowpaths of the various fluids are more clearly shown. As shown in FIG. 2 and FIG. 3, stream 1 enters at inlet 36 adjacent the rotor 28. The flow of the stream 1 within the center body is shown by reference numerals 46. The stream 1 enters the center body 26 and flows from rotor 28 to rotor 30, where it reenters and exits the rotor. Stream 1 then exits the regenerative equipment 10 at outlet 38 of stream 1. Similarly, stream 2 enters the regenerative equipment 10 at inlet 40, passes through the center body section (indicated by reference numerals 48) and then enters the rotor 28. The stream 2 then exits the regenerative equipment 10 at outlet 42. The purge stream 3 enters from rotor 28, passing through sections of the center body between flows 46 and 48, and exits from rotor 30. FIG. 3 also more clearly shows the connection rod 44.

Figure 4:
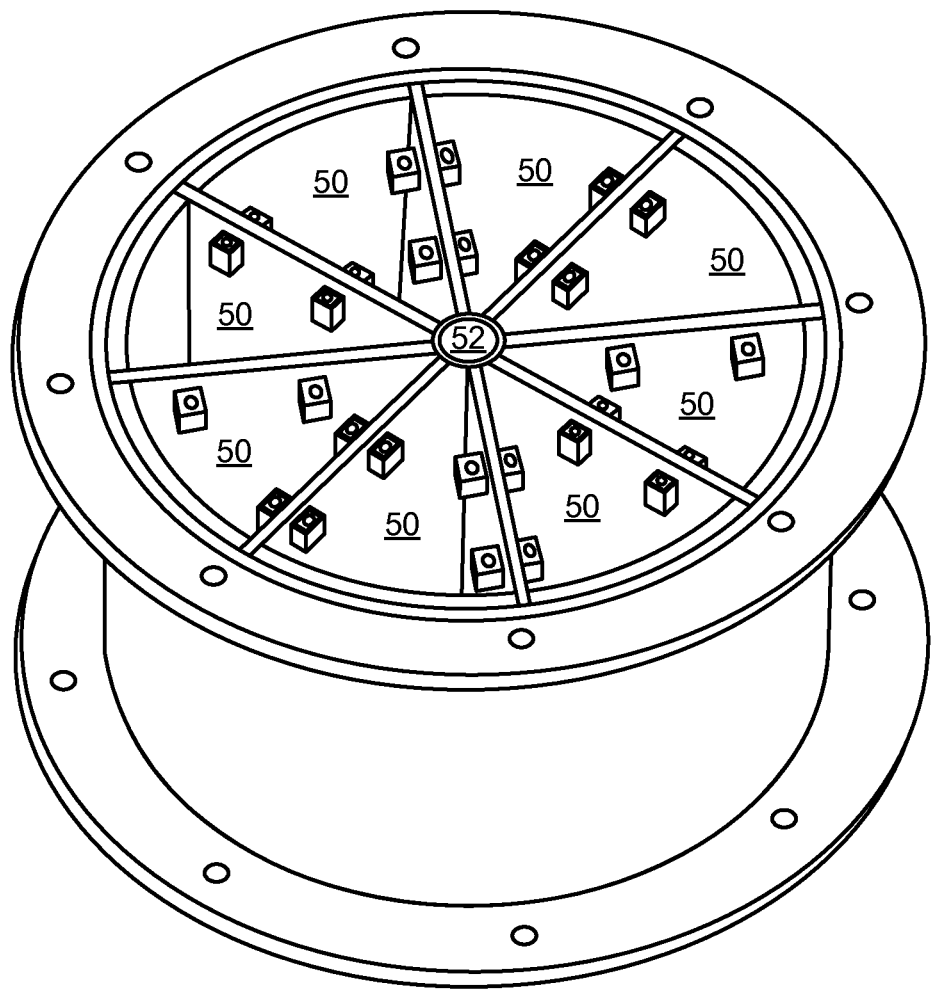
FIG. 4 is an isolated view of the center body portion of the regenerative equipment of the first embodiment of the present invention.

FIG. 4 shows a perspective view of the center body portion 26 of the regenerative equipment 10 of the present invention. Importantly, it can be seen that the center body section 26 is divided into eight center body sections 50. Baffles or partitions are positioned between the center body section 50. Also shown in FIG. 4 is the pathway 52 for connection rod 44 to extend between rotor 28 and rotor 30. The configuration of the rotors allows for the introduction of the fluid into half of the center body sections 50, while the other fluid (i.e. stream 1 or stream 2) is introduced into the other half of the center body sections 50. The center body section 26 could be partitioned into many sections. Depending on the application, each section could contain heat storage or molecule storage materials. It could also contain a solid catalyst for chemical reactions. The center body could also use monolith honeycomb material and the paltition walls are not needed in such a case.

An important aspect of the present invention is that it allows for regenerative methods, such as rotary air dehumidifiers or regenerative heat exchangers, to be utilized wherein the center body sections containing the heat exchange material or molecular storage material do not need to be rotated. Often times, the center body sections of such apparatuses can be very heavy and difficult to rotate. The present invention allows for simple rotation of the flow of the fluid entering the apparatus, without having to move the actual source of the fluid.

In chromatography, the simulated moving bed (SMB) technique is a variant of high performance liquid chromatography. It is used to separate particles and/or chemical compounds that would be difficult or impossible to resolve otherwise. This increased separation is typically brought about by a valve-and-column arrangement that is used to lengthen the stationary phase indefinitely. In the moving bed technique of preparative chromatography, the feed entry and the analyte recovery are simultaneous and continuous, but because of practical difficulties with a continuously moving bed in the simulated moving bed technique, instead of moving the bed, the sample inlet and the analyte exit positions are moved continuously, giving the impression of a moving bed.

True moving bed chromatography (MBC) is only a theoretical concept. Its simulation, SMBC, is achieved in the prior art by the use of a multiplicity of columns in series and a complex valve arrangement, which provides for sample and solvent feed, and also analyte and waste takeoff at appropriate locations of any column, whereby it allows switching at regular intervals the sample entry in one direction, the solvent entry in the opposite direction, whilst changing the analyte and waste takeoff positions appropriately as well.

SMB apparatuses of the prior art are rather complex. It was found by the inventor that the use of the rotor concept described in the previous embodiment could be used in a single specialized valve to achieve SMB operation without the complex multiple valve arrangement.

Figure 5:
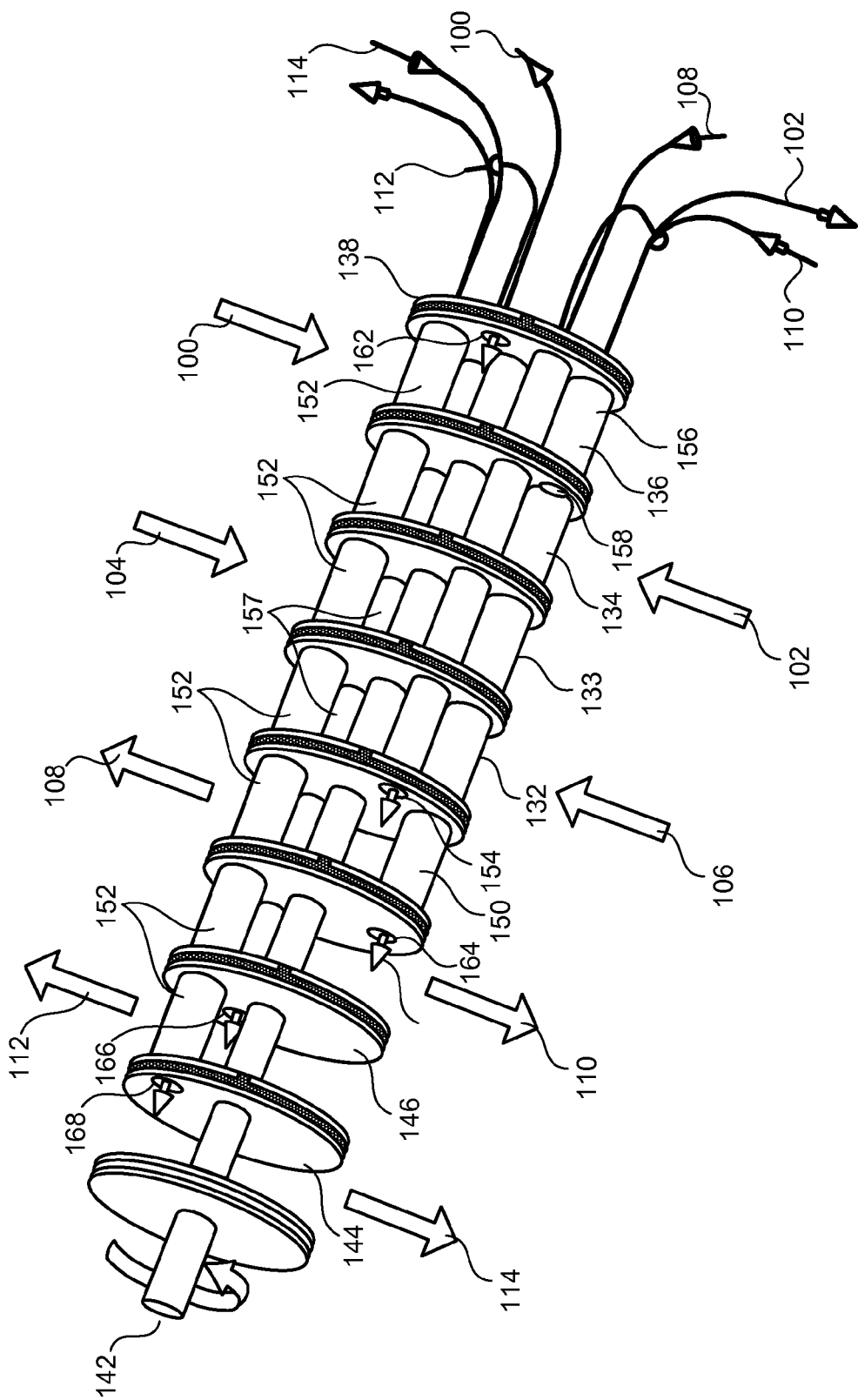
FIG. 5 is a perspective view of the rotor of a flow distribution valve for the simulated moving bed of the second embodiment of the present invention.

Referring to FIG. 5, there is shown the rotor 142 of the simulated moving bed apparatus with one rotor of the second embodiment of the present invention. The rotor 142 has a first section 144, a second section 146, a third section 148, a fourth section 150, a fifth section 132, a sixth section 133, a seventh section 134, and an eighth section 136. The rotor 142 utilizes similar pathway technology as described in the first embodiment of the present invention. Fluid 114 exiting the first section 144 of the rotor 142 is withdrawn from opening 168 of tunneling tubes 152 for the first section 144. These tunneling tubes pass through the rotor from section 144 to the end plate 138. Thus, fluid of first section 144, which enters a tunneling tube at end plate 138, bypasses the various other sections.

Fluid 112 exiting the second section 146 is withdrawn from the inlet/outlet 166. Before exiting the inlet/outlet 166, the fluid flows through the tunneling tubes 157. The tunneling tubes 157 open to the top of the rotor adjacent the end plate 138. Similarly, other inlet and outlet streams flow the same way, bypassing rest of the sections and flow from one end to the other end of the rotor 142 without mixing with the rest of the streams. Finally, fluid 100 entering the eighth section 136 is directed through the inlet/outlet 162 and out of the rotor adjacent the top plate 138.

Figure 6:
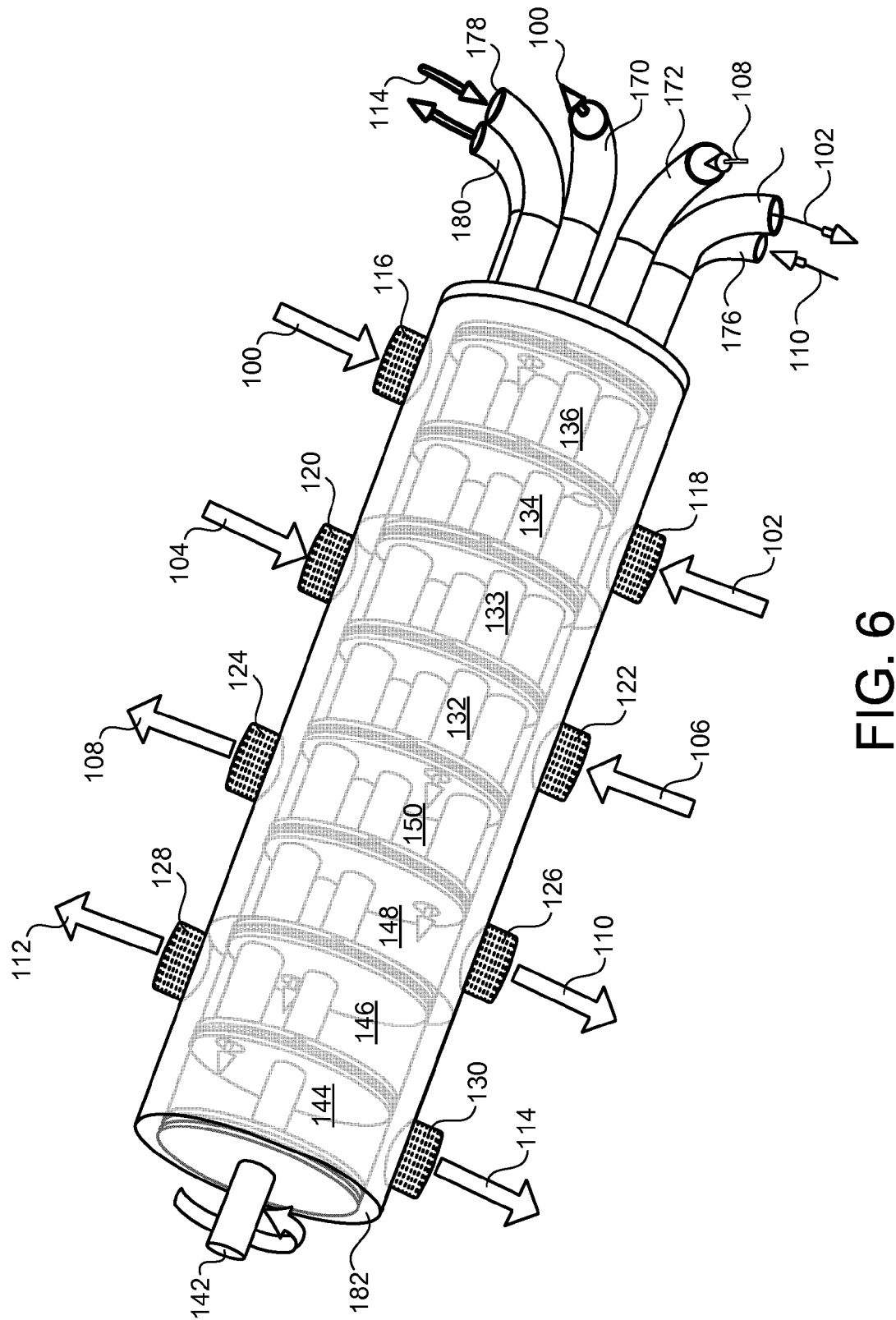
FIG. 6 is a partially transparent perspective view of the rotor and the matching valve body for the simulated moving bed of the second embodiment of the present invention.

Referring to FIG. 6, there is shown the flow pathway of the eight fluids through a single rotor 142 and a matching valve body 182 of the present invention. In FIG. 6, it can be seen how one product stream 114 enters the rotor from tube 178, and travels through the various tunneling tubes up into the first section 144. Stream 114 then exits the rotor through nozzle 130. Similarly, the stream 110 enters the rotor from tube 176 and travels through the tunneling tube into the third section 148. From this third section 148, stream 110 then exits the rotor 142 through nozzle 126. The stream 102 enters the rotor 142 at the seventh section 134 via nozzle 118. Stream 102 is directed through the inlet/outlet hole and through the respective tunneling tubes and outward of the rotor at tube exit 174. Similarly, stream 100 enters the rotor 142 at the eighth section 136 via nozzle 116. It then travels through the respective inlet/outlet hole and exits the rotor at tube exit 170. The nozzles 116, 118, 120, 122, 124, 126, 128, 130 are connected to feed and product storage tanks via tube connections. Tubes 170, 172, 174, 176 178, 180 etc. are connected to chromatography columns.

Figure 7:
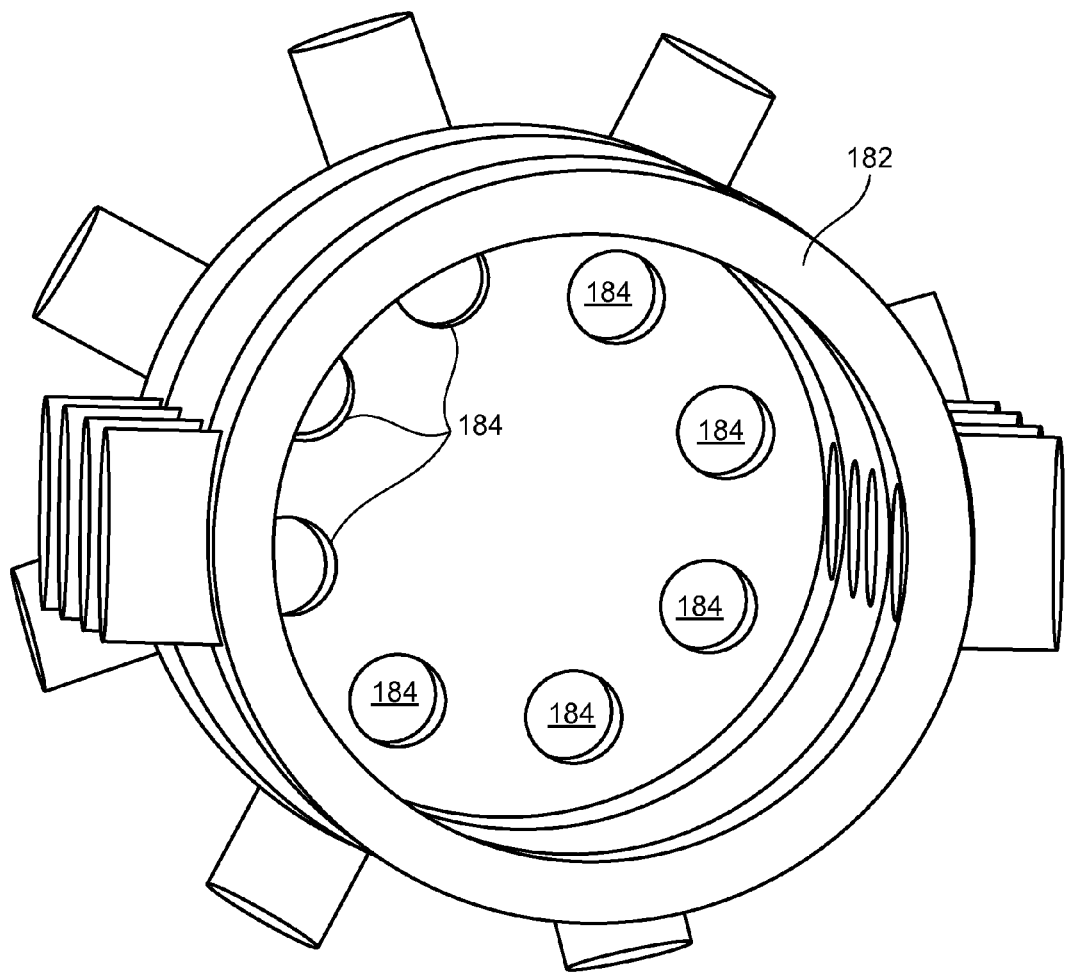
FIG. 7 is a perspective view of the valve body for the simulated moving bed of the second embodiment of the present invention.

Referring to FIG. 7, there is shown the top view of the valve body 182 that matches rotor 142. There are eight openings 184 that could align with eight openings at the end plate of rotor 142, allowing fluids to pass through. When rotor 142 rotates, openings at the rotor move through the openings at the valve body sequentially, distributing different fluids to different tubes at different times. Tubes on the valve body 182 could be connected to chromatography columns and deliver feeds to them as well as retrieve products from them, enabling the operation of moving bed chromatography when rotor 142 rotates.

Figure 8:
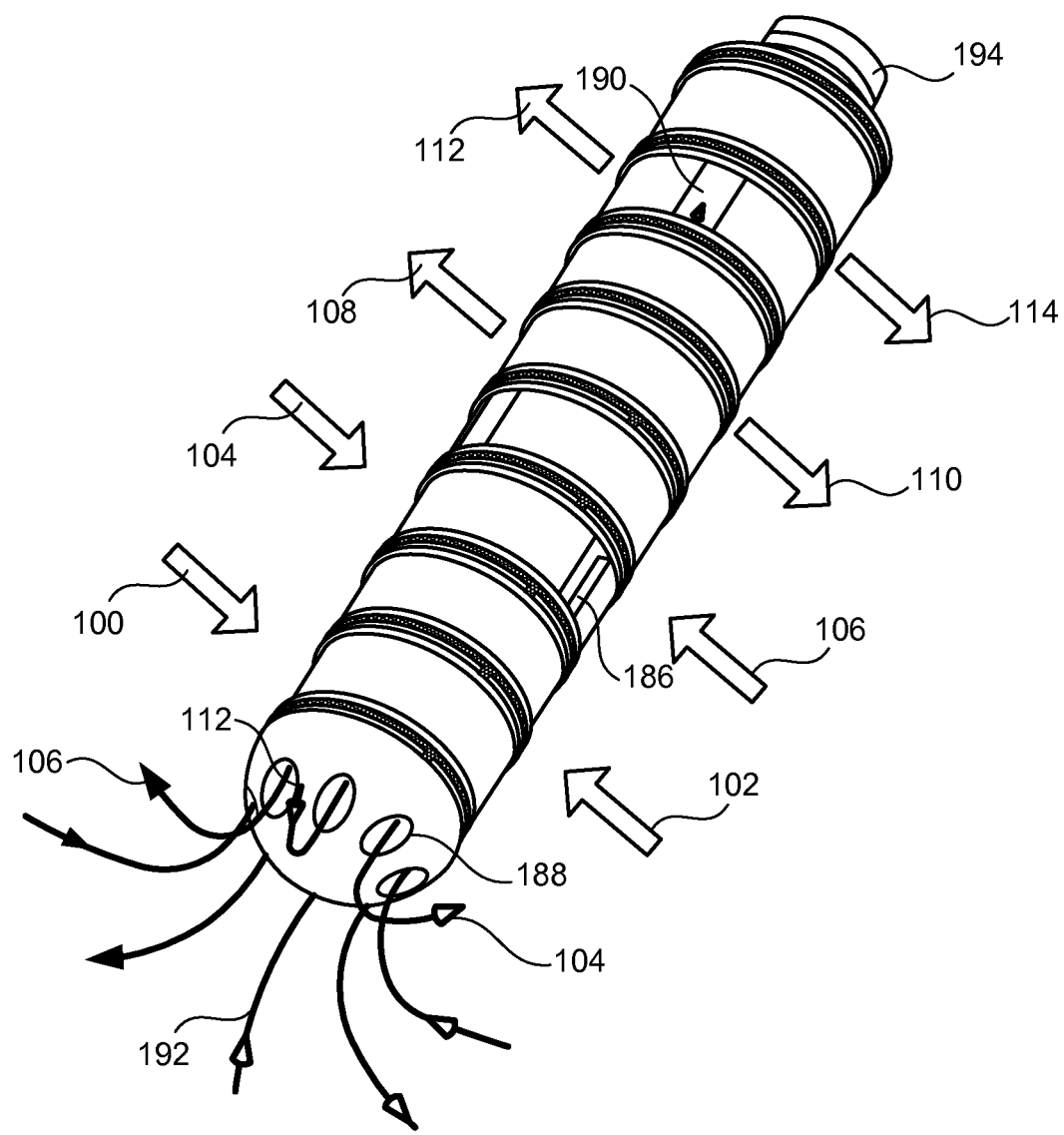
FIG. 8 is a perspective view of the rotor of a flow distribution valve for the simulated moving bed of the third embodiment of the present invention.

Referring to FIG. 8, there is shown the rotor 194 of a further embodiment of the present invention. The rotor 194 has eight sections. The rotor 194 utilizes similar pathway technology as described in the second embodiment of the present invention. Instead of using multiple tubes connected through many separation plates, rotor 194 is constructed of a single solid rod. Tunneling tubes are made by drilling multiple holes of different end points in the solid rod rotor 194. Such a method could simplify the manufacturing process of the rotor since the repeated welding of tunneling tubes to the separation plates could be avoided. Rotor 194 is also mechanically stronger than the second embodiment of rotor 142 if both are made of the same material.

Figure 9:
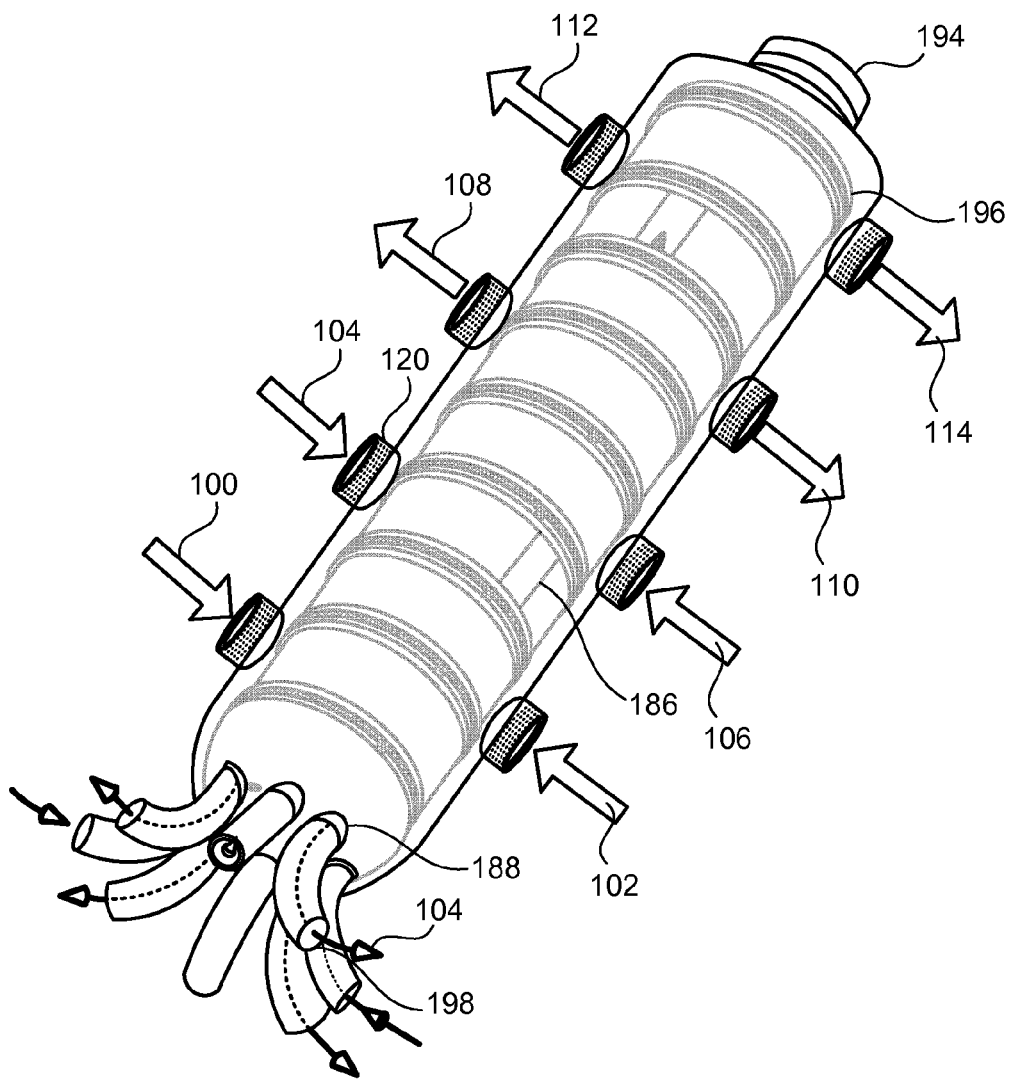
FIG. 9 is a partially transparent perspective view of the rotor and the matching valve body for the simulated moving bed of the third embodiment of the present invention.

As an example for FIG. 8, a fluid 104 enters the sixth section of the rotor 194, flows around the recessed rotor surface to reach opening 186, and then passes through tunneling tube to emerge from opening 188 at the head of the rotor 194. Thus, fluid 104 bypasses the seventh and eighth sections and flows into a tube of the valve body as illustrated by FIG. 9 described subsequently. Similarly, the fluid 112 enters opening 192, passes through the tunneling tube to emerge from opening 190 at second section, flows around the recessed rotor surface to exit rotor 194.

FIG. 9 shows the rotor 194 with matching valve body 196. The fluid 104 enters the sixth section of the rotor 194 via nozzle 120, flows around the recessed rotor surface to reach opening 186, passes through tunneling tube to emerge from opening 188 at the head of the rotor 194 and exit the valve system through tube 198. The rotor and matching valve body of third embodiment of present invention have spherical heads, which create a better seal for critical applications. Nozzles on the valve body 196, such as nozzle 120, are connected to feed and product storage tanks via tube connections. Tubes on the valve body 196, such as tube 198, are connected to various chromatography columns to supply feeds to them and withdraw products from them.

Figure 10:
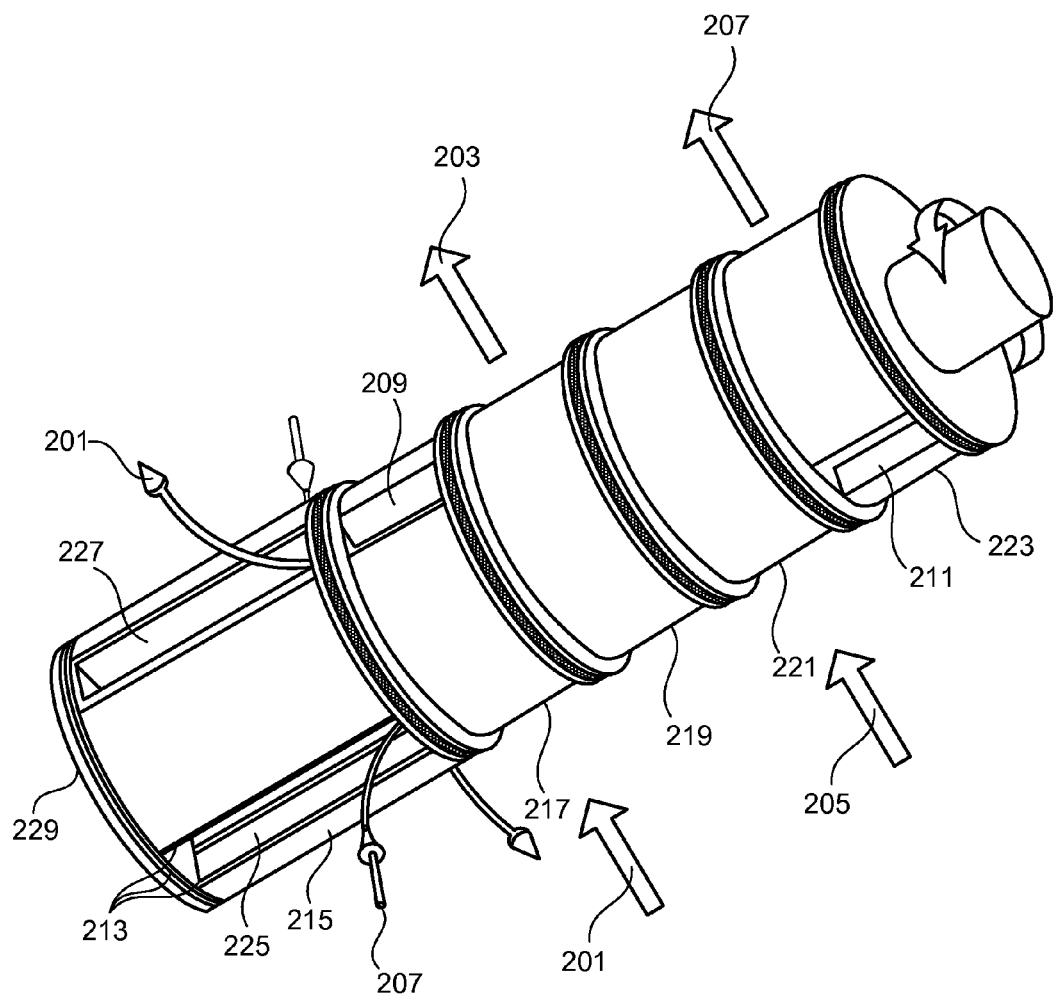
FIG. 10 is a perspective view of the rotor of a flow distribution valve for the simulated moving bed of the fourth embodiment of the present invention.

Referring to FIG. 10, there is shown the rotor 229 of still another embodiment of the present invention. The rotor 229 has five sections. The rotor 229 utilizes similar pathway technology as described in the third embodiment of the present invention. Rotor 229 is constructed of a single solid rod. Tunneling tubes are made by drilling multiple holes of different end points in the solid rod. The first four sections 223, 221, 219, 217 are for feed streams 201, 205 and product streams 203, 207. Feed streams and product streams are connected to feed storage tanks and product storage tanks via non-rotational tubing and fittings. The first four sections 223, 221, 219, 217 have recessed surfaces so that fluids could flow around the peripheral of the surface to enter/exit the tunneling tubes. The fifth section 215 is the section for fluids to be connected to chromatography columns via tubing connections. Different from the third embodiment, fluids are sent to and received from chromatography columns through the side cylindrical surface of section 215 instead of through the end plate of the rotor. The cylindrical surface of the fifth section 215 is not recessed and there is no flowpath between two fluids slots, such as slots 225 and 227. O-rings 213 seal each slot so that a fluid would be confined in the same fluid channel within the rotor and valve body assembly, and not mix with other fluids.

Figure 11:
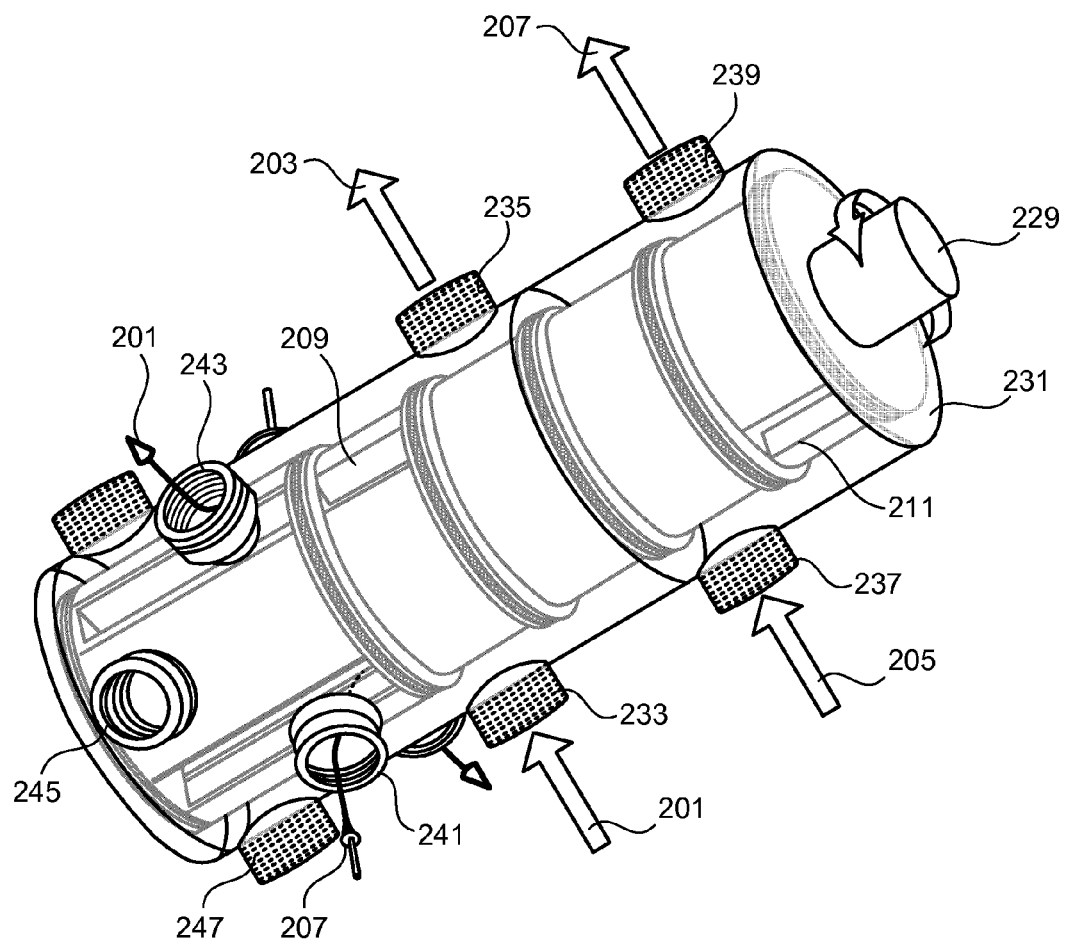
FIG. 11 is a partially transparent perspective view of the rotor and the matching valve body for the simulated moving bed of the fourth embodiment of the present invention.

As shown by FIG. 10, the fluid 201 enters the fourth section 217 of the rotor 229, flows around the recessed rotor surface to reach opening 209, passes through tunneling tube to emerge from opening 227 at the fifth section 215 of the rotor 229. Similarly, the fluid 207 enters opening 225, passes through tunneling tube to emerge from opening 211 at first section 223, flows around the recessed rotor surface to exit rotor 229. Thus, fluid 207 bypasses sections 217, 219, 221 and flows from a chromatography column to a storage tank unmixed with other fluids FIG. 11 shows the rotor 229 with matching valve body 231. The fluid 201 enters the fourth section of the rotor 229 via nozzle 233, flows around the recessed rotor surface to reach opening 209, passes through tunneling tube to emerge from nozzle 243 at the side of valve body 231 and enters a chromatographic column via tubing connections. Similarly, the fluid 207 enters nozzle 241 from a chromatography column via tubing connections, passes through the tunneling tube to emerge from opening 211 at first section 223, flows around the recessed rotor surface to exit rotor 229 from nozzle 239. At the particular rotational location of the rotor as shown by FIG. 11, nozzles 243, 241 and two other nozzles at the same height are aligned with fluid channels, and only chromatography columns connected with those nozzles are receiving feeds and withdrawing products. Nozzles 245, 247 and the other two nozzles at the lower level are blocked by the solid surface of the fifth section 215 of the rotor 229.

Figure 12:
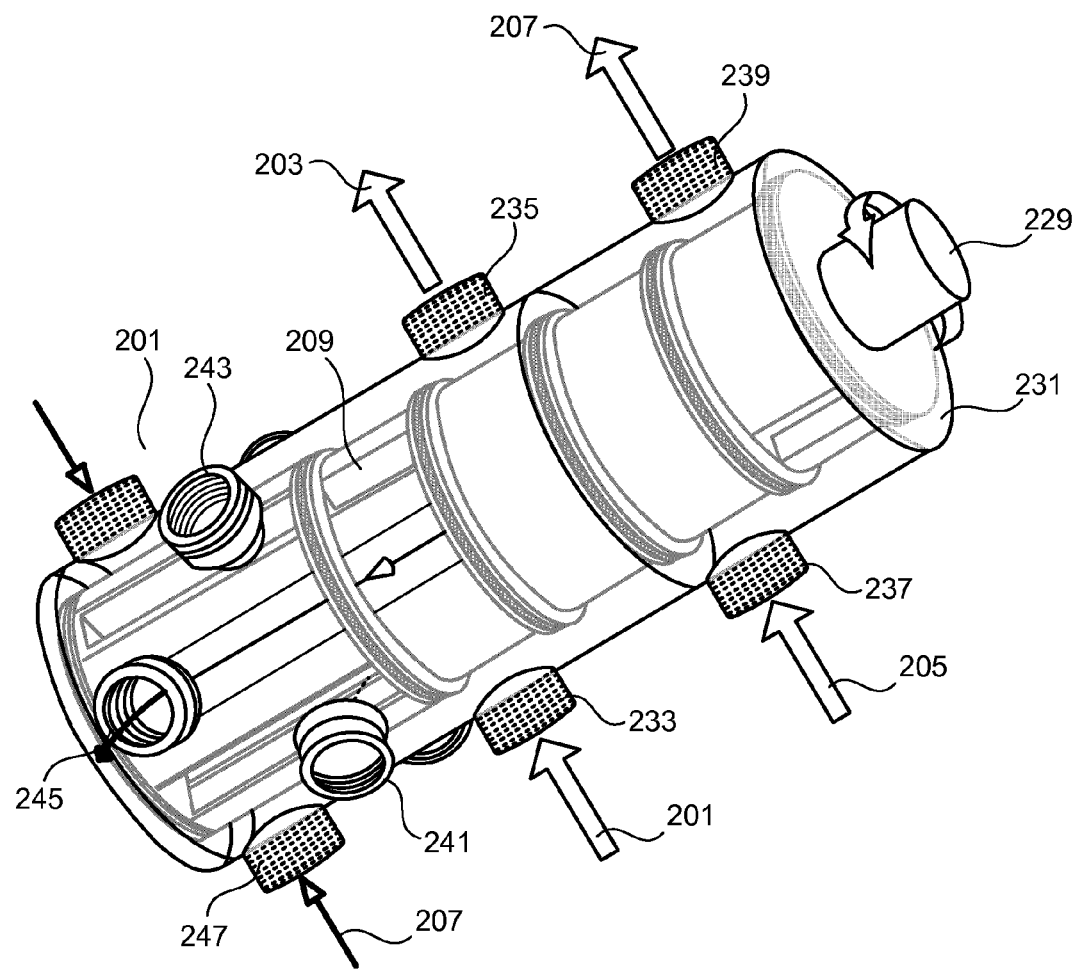
FIG. 12 is a partially transparent perspective view of the rotor and the matching valve body for the simulated moving bed of the fourth embodiment of the present invention. The rotor is rotated and different nozzles are connected to/from the chromatography columns.

FIG. 12 shows that when the rotor 229 rotates 45°, nozzles 245, 247 and two other nozzles at the lower level are aligned with fluid channels, and only chromatography columns connected with those nozzles are receiving feeds and withdrawing products. Nozzles 241, 243 and other two nozzles at the higher level are blocked by solid surface of the fifth section 215 of rotor 229. Long fluid slots of 225 and 227 at section 215 of rotor 229 and the multileveled nozzle arrangement of valve body 231 serve the purpose of spreading nozzles apart so that there is enough working space for tubing connections.

Figure 13:
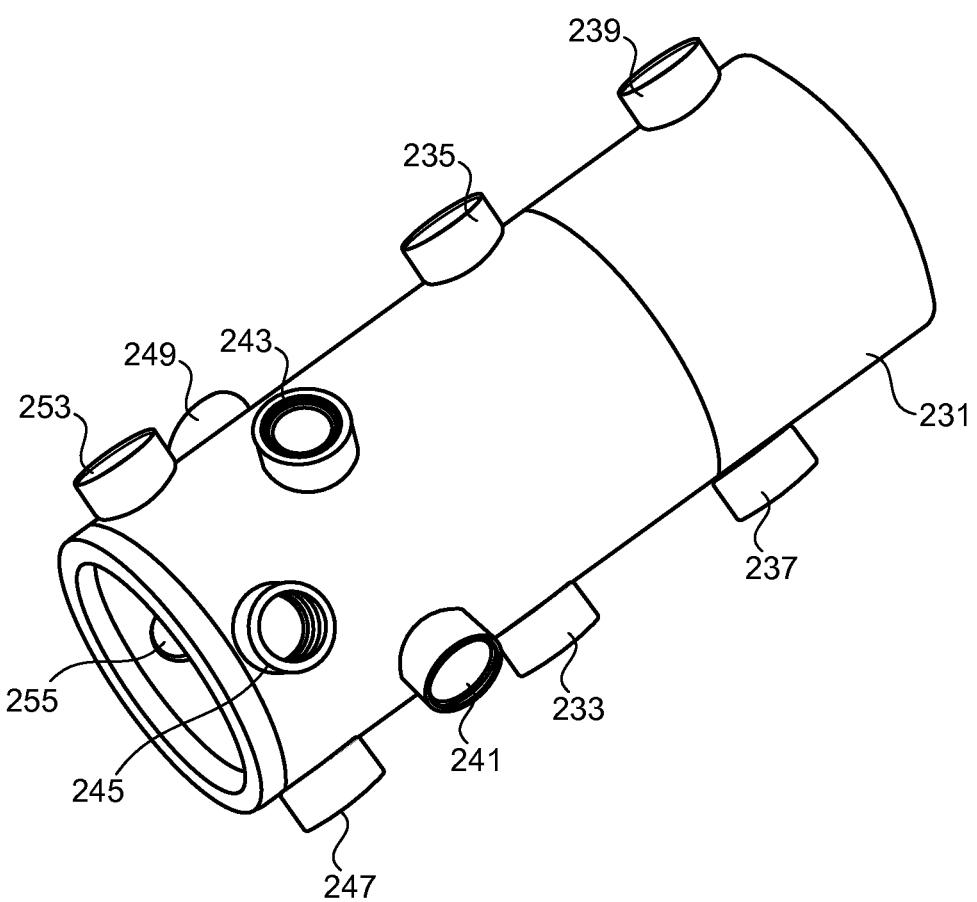
FIGS. 13 and 14 are perspective views of the valve body for the simulated moving bed of the fourth embodiment of the present invention.
Figure 14:
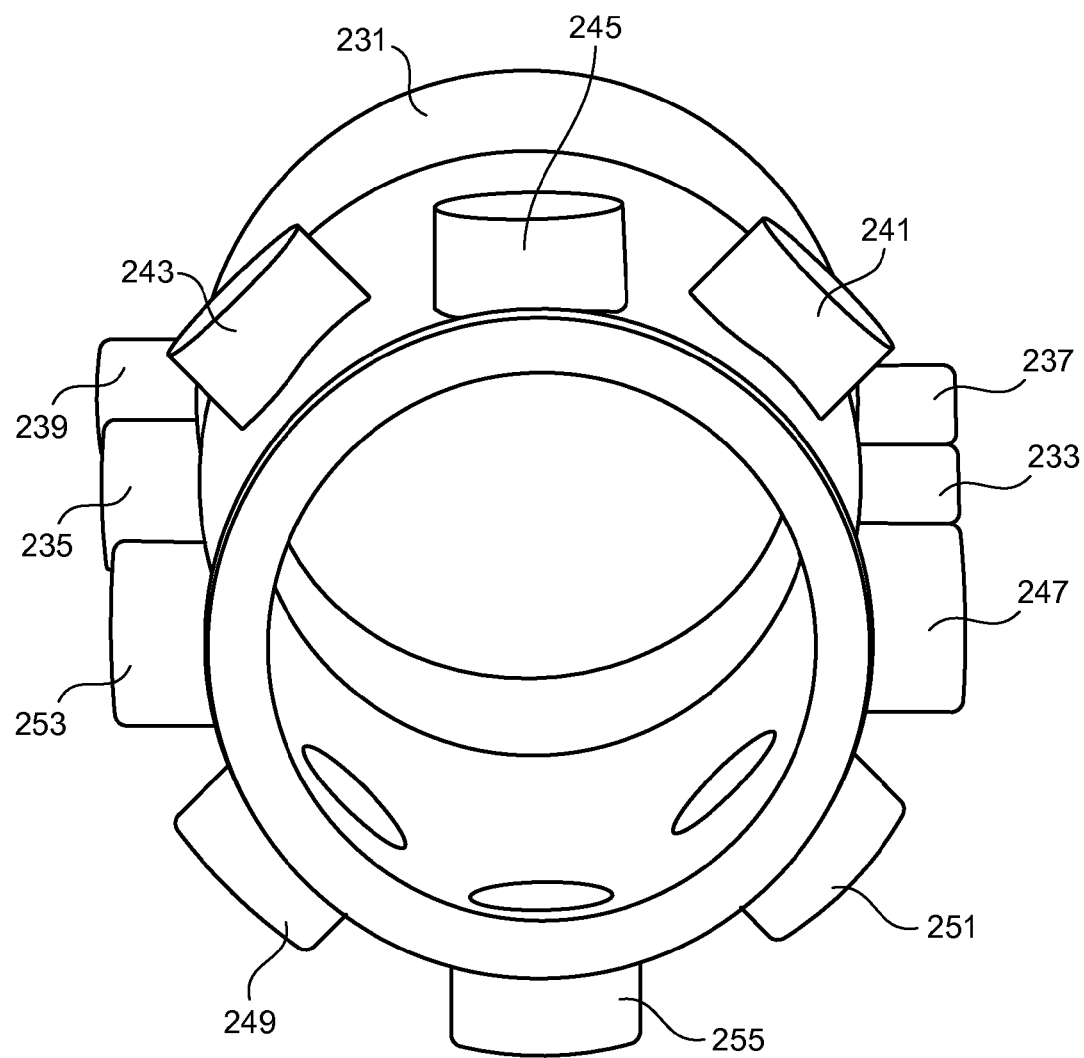

Referring to FIGS. 13 and 14, there is shown the valve body 231 of the embodiment shown in FIGS. 10-12. The valve body does not have to have end plates to confine the rotor since the sealing of fluid is accomplished by O-rings on the rotor 229. Four nozzles 233, 235, 237, 239 are used for connection of feed and product streams to storage tanks. Eight nozzles 241, 243, 245, 247, 249, 251, 253 and 255 on two levels aligned with section 215 of rotor 229 are used for connection of feed and product streams to chromatography columns. Rotor 229 could be easily removed from either end of the valve body 231 since no end plate is necessary with such an open valve body design.

Figure 15:
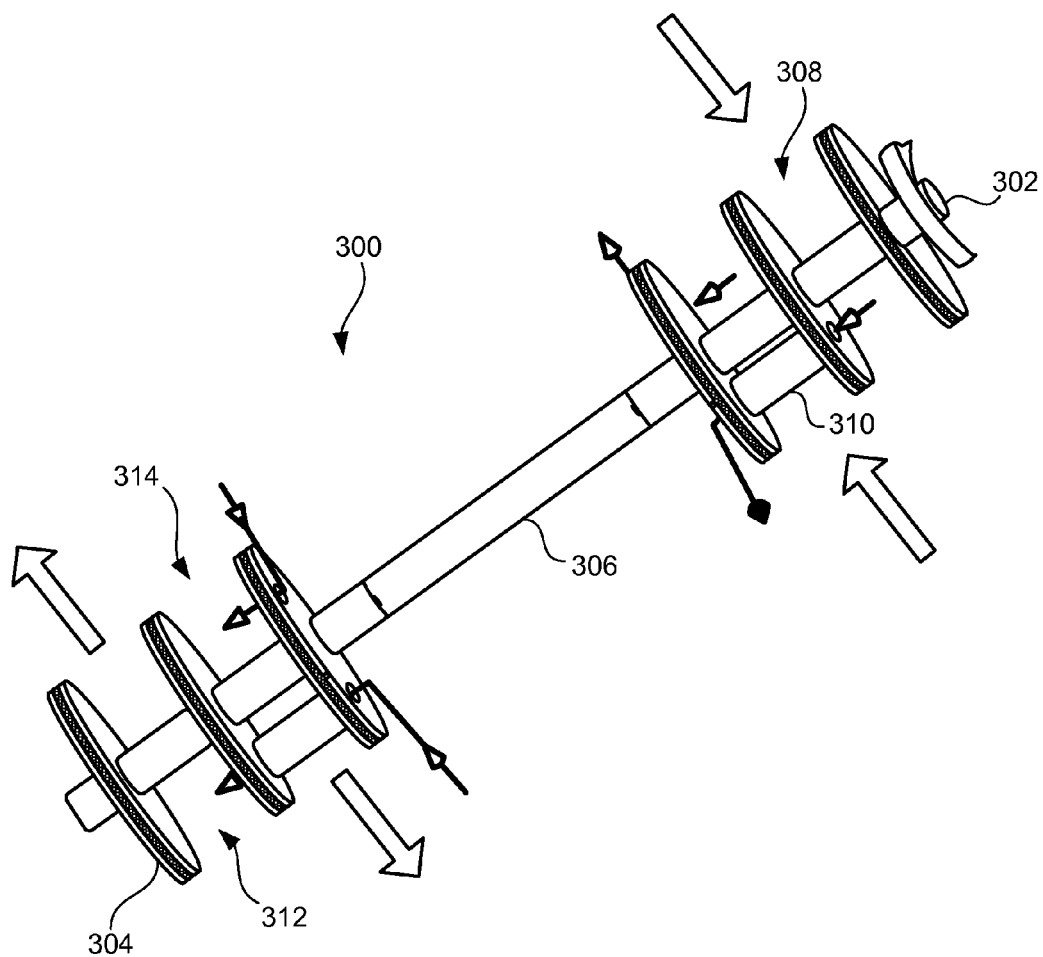
FIG. 15 is a perspective view of the rotors and connection rod for use in the simulated moving bed system of the fifth embodiment of the present invention.

Referring to FIG. 15, there is shown a schematic view with flow paths for the simulated moving bed apparatus 300 with two rotors of the fifth embodiment of the present invention. In FIG. 15 it can be seen that a top rotor 302 is connected to the bottom rotor 304 via the connection rod 306.

Feed is introduced into the first section 308 of the top rotor 302. The feed then travels through a tunneling tube into the center body section of the moving bed apparatus 300. Similarly, eluent is introduced into the second section 310 of the top rotor 302. The eluent goes through the outlet hole of the rotor 302 and is directed into the center body section of the moving bed apparatus 300. Extract is withdrawn from the tunneling tube of the bottom rotor 304 and into the first section 312 of the bottom rotor 304. The extract is then directed outwardly of the bottom rotor 304. Raffinate enters the bottom rotor 304 through an inlet/outlet hole. The raffinate enters the second section 314 of the bottom rotor 304 and then exits through the bottom rotor 304. The various tunneling tubes and inlet/outlet holes are importantly orientated 90° with respect to one another. This allows for the present invention to achieve the simulated moving bed functions of the present invention. Whereas in the two rotor embodiment described previously the various rotors are synchronized such that the inlet and outlet portions are aligned, in the simulated moving bed embodiments, these rotors are synchronized such that the various inlets and outlets are orientated 90° with respect to one another.

Figure 16:
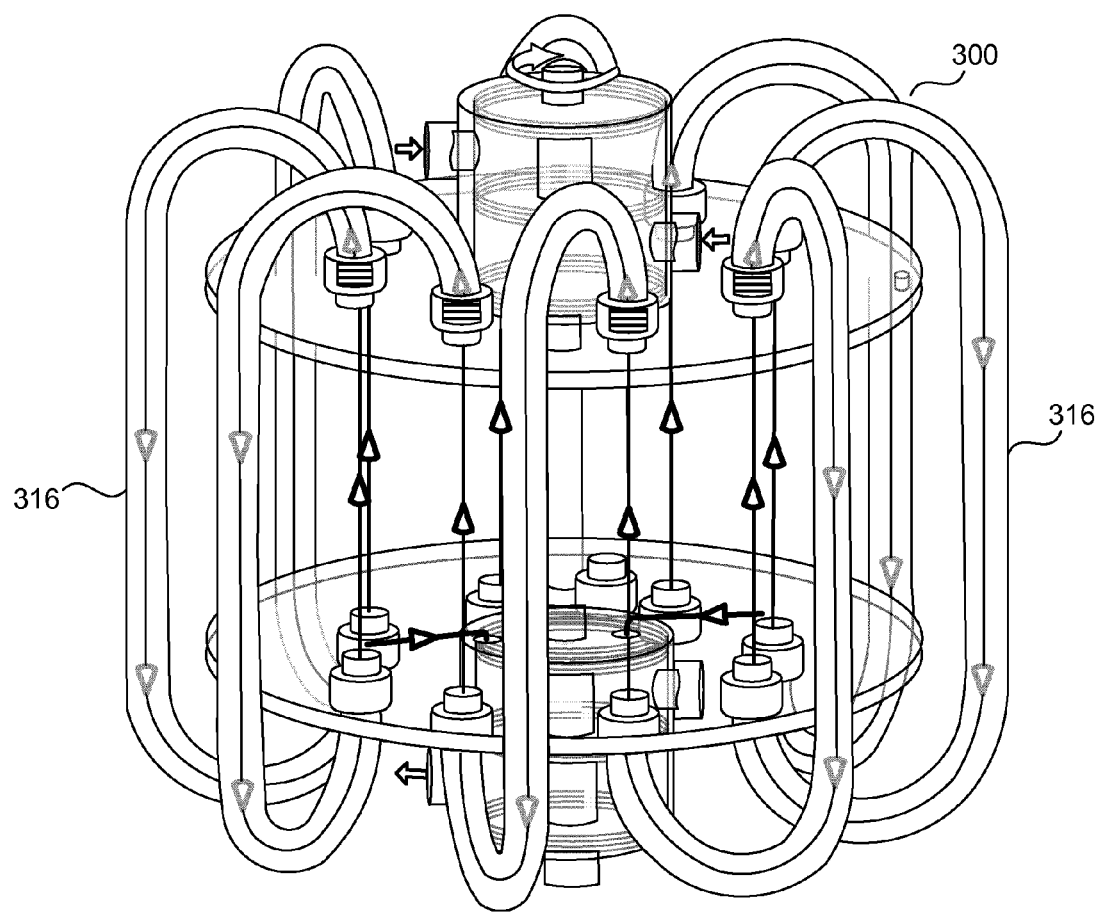
FIG. 16 is a perspective view, partially transparent, of the simulated moving bed system of the fifth embodiment of the present invention.

FIG. 16 shows a schematic view, partially transparent, of the simulated moving bed apparatus with two rotors 300 of the present invention. In FIG. 16, it can be seen how there are circulation tubes 316 connected to the heads of the moving bed apparatus 300. Arrows indicate the flow of the fluid within the moving bed apparatus 300. Importantly, it can be see how the connection tubes 316 take fluid leaving one center body section and introduce it to the bottom of a subsequent center body section. This fluid rotation allows for the present invention to achieve the simulated moving bed affect.

Figure 17:
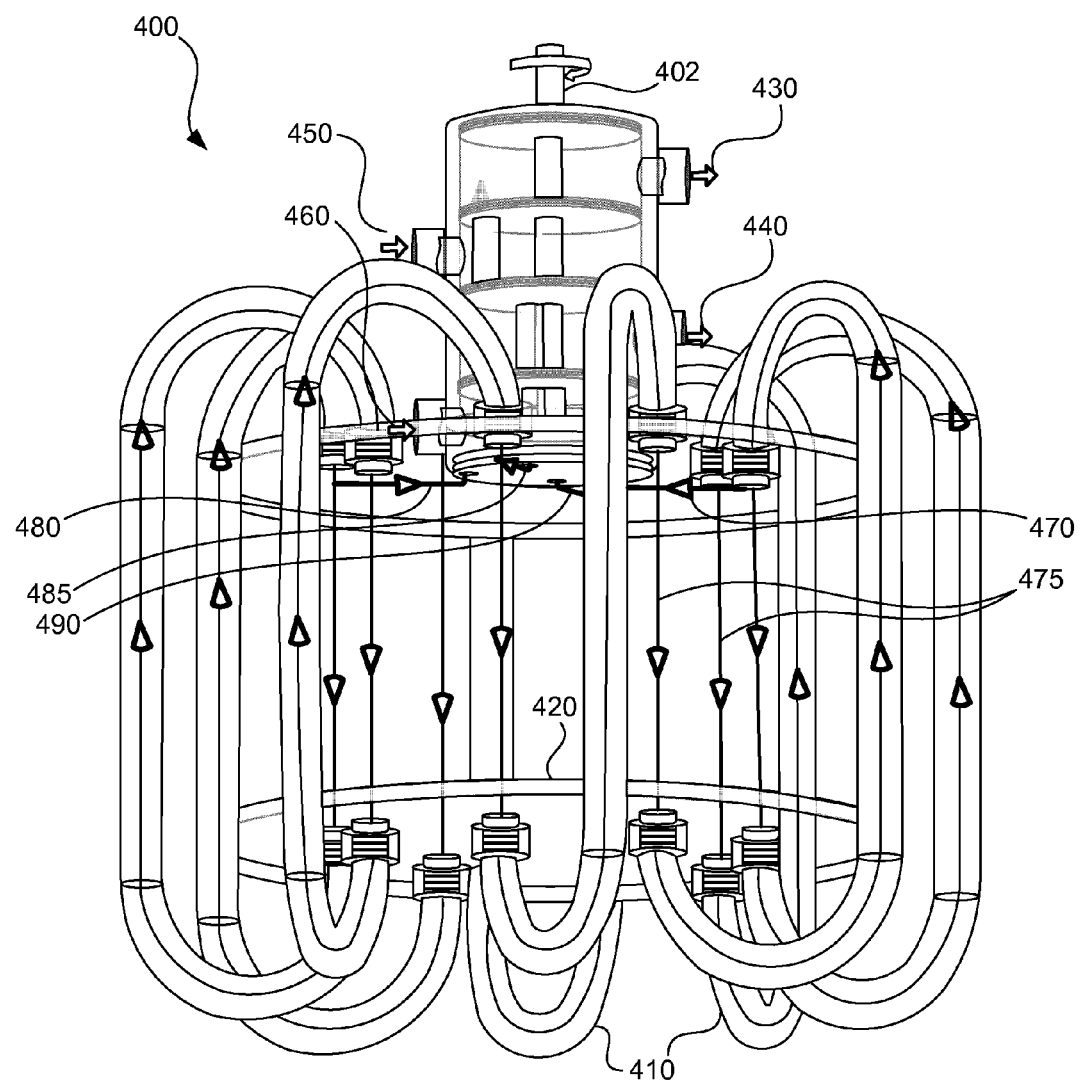
FIG. 17 is a perspective view, partially transparent, of the simulated moving bed system, utilizing a single rotor, of the sixth embodiment of the present invention.

FIG. 17 shows a schematic view, partially transparent, of the simulated moving bed apparatus with one rotor 400 of the sixth embodiment of the present invention. The rotor 402 of the simulated moving bed apparatus 400 is similar to rotors previously described and the configuration of the circulation tubes 410 is identical to that shown in FIG. 16. The flow of the raffinate (430, 480), eluent (460, 490), extract (440, 470), and feed (450, 485) is easily seen in FIG. 17. Since no connection rod is needed for this embodiment, the pathway for the connection rod could be filled with a spacer to occupy the dead space. Streams of internal flow (475) are separated by plates in the center body and confined by the bottom head 420 and top head.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A rotary fluid distribution apparatus comprising:
    a first head having a wall extending around an interior volume thereof, said wall having a first orifice formed through said wall so as to open to said interior volume and a second orifice formed through said wall so as to open to said interior volume, said first head having a first flowpath and a second flowpath communicating with said interior volume thereof;
    a rotor extending through said interior volume;
    a first separation plate positioned within said first head, said first separation plate having an opening formed therethrough, said first separation plate defining a first fluid section and a second fluid section within said head;
    a second separation plate positioned within said first head in spaced relation to said first separation plate, said second separation plate having a first opening and a second opening formed therein;
    a tunneling channel extending across said second fluid section and in communication between said opening of said first separation plate and in communication with said second opening of said second separation plate, said tunneling channel being movable relative to a rotation of said rotor; and
    a third separation plate positioned in said head on a side of said first separation plate opposite said second separation plate, said first separation plate and third separation plate defining said first fluid section, said first separation plate and said second separation plate defining said second fluid section.

2. The rotary fluid distribution apparatus of claim 1, wherein said tunneling channel is movable between a first position in which said tunneling channel communicates between said opening of said first separation plate and with a first flowpath of said first head and a second position in which said tunneling channel communicates between said opening of said first separation plate and a second flowpath of said first head.

3. The rotary fluid distribution apparatus of claim 1, wherein said first fluid section is in communication with said first orifice of said first head, said second fluid section being in communication with said second orifice of said first head.

4. The rotary fluid distribution apparatus of claim 1, wherein said tunneling channel has a radius less than a radius of said first separation plate.

5. The rotary fluid distribution apparatus of claim 1, wherein said tunneling channel has a generally semi-cylindrical shape with a radius less than a radius of said first separation plate.

6. The rotary fluid distribution apparatus of claim 1, wherein said tunneling channel is a pipe having an interior passageway with a diameter generally equal to a diameter of said opening of said first separation plate.

7. The rotary fluid distribution apparatus of claim 1, further comprising:
    a driving means for rotating said rotor between a first position and a second position.

8. A rotary fluid distribution apparatus comprising:
    a first head having a wall extending around an interior volume thereof, said wall having a first orifice formed through said wall so as to open to said interior volume and a second orifice formed through said wall so as to open to said interior volume, said first head having a first flowpath and a second flowpath communicating with said interior volume thereof;
    a rotor extending through said interior volume;
    a first separation plate positioned within said first head, said first separation plate having an opening formed therethrough, said first separation plate defining a first fluid section and a second fluid section within said head;
    a second separation plate positioned within said first head in spaced relation to said first separation plate, said second separation plate having a first opening and a second opening formed therein;
    a tunneling channel extending across said second fluid section and in communication between said opening of said first separation plate and in communication with said second opening of said second separation plate, said tunneling channel being movable relative to a rotation of said rotor;
    a purge section positioned in said first head and on a side of said second separation plate opposite said first fluid section, said purge section having at least one hole opening on a side thereof opposite said second separation plate.

9. A rotary fluid distribution apparatus comprising:
    a first head having a wall extending around an interior volume thereof, said wall having a first orifice formed through said wall so as to open to said interior volume and a second orifice formed through said wall so as to open to said interior volume, said first head having a first flowpath and a second flowpath communicating with said interior volume thereof;
    a rotor extending through said interior volume;
    a first separation plate positioned within said first head, said first separation plate having an opening formed therethrough, said first separation plate defining a first fluid section and a second fluid section within said head;
    a second separation plate positioned within said first head in spaced relation to said first separation plate, said second separation plate having a first opening and a second opening formed therein;
    a tunneling channel extending across said second fluid section and in communication between said opening of said first separation plate and in communication with said second opening of said second separation plate, said tunneling channel being movable relative to a rotation of said rotor;
    a center body positioned at an end of said first head, said center body communicating with said first flowpath and said second flowpath, said rotor having a portion extending through said center body, said rotor being rotatable independently of said center body.

10. The rotary fluid distribution apparatus of claim 9, wherein said first head is affixed to one side of said center body, said center body being stationary.

11. The rotary fluid distribution apparatus of claim 9, wherein said center body having a plurality of sections formed therein, said rotor being rotatable to a position such that a first stream of a fluid flows to at least one of said plurality of sections of said center body and that a second stream of another fluid flows through another one of said plurality of sections, said rotor being rotatable to another position such that said first stream of the fluid flows through said at least another one of said plurality of sections and such that said second stream of the another fluid flows through said at least one of said plurality of sections.

12. The rotary fluid distribution apparatus of claim 11, wherein said center body has a generally cylindrical configuration, said plurality of sections being defined by a plurality of walls radiating from a center of said center body toward an outer wall of said body.

13. The rotary fluid distribution apparatus of claim 9, further comprising:
a second head positioned on a side of said center body opposite said first head, said rotor extending through said center body and said second head, said second head having an interior volume, said second head having a first orifice and a second orifice opening through a wall thereof, said second head having a first flowpath and a second flowpath communicating with said interior volume of said second head;
a third separation plate positioned in said second head, said third separation plate having an opening formed therein, said third separation plate positioned between a first fluid section and a second fluid section in said second head;
a fourth separation plate positioned within said second head in spaced relation to said third separation plate, said fourth separation plate having a first opening and a second opening formed therein; and
another tunneling channel extending across said second fluid section of said second head and communicating between said opening of said third separation plate and said first opening of said fourth separation plate, another tunneling channel being movable relative to a rotation of said rotor.

14. The rotary fluid distribution apparatus of claim 13, wherein said center body communicates with said first flowpath and said second flowpath of said second head.

15. The rotary fluid distribution apparatus of claim 13, wherein said rotor is rotatable to a first position in which said first fluid stream enters said first orifice and flows through said tunneling channel into said at least one section of said plurality of sections of said center body and flows from said center body through said another tunneling channel of said second head and outwardly of said first orifice of said second head and in which a second fluid stream enters said second orifice of said second head and flows around said another tunneling channel so as to pass into said another section of said plurality of sections of said center body and outwardly through said second orifice of said first head.

16. The rotary fluid distribution apparatus of claim 15, wherein said rotor is rotatable to a second position in which said second fluid stream enters said first orifice of said first head so as to flow around said tunneling channel and into said at least another one section of said plurality of sections of said center body, said second fluid stream passing outwardly of said center body through said another tunneling channel of said second head and outwardly through said first orifice of said second head.

17. The rotary fluid distribution apparatus of claim 16, wherein said second fluid stream enters said second orifice of said second head when said rotor is in said second position so as to flow around said another tunneling channel so as to flow into said at least one section of said plurality of sections, said second fluid stream passing outwardly of said center body so as to flow outwardly through said second orifice of said first head.

18. The rotary fluid distribution apparatus of claim 13, wherein said rotor has a first portion extending through said first head and a second portion extending through said center body and a third portion extending through said second head, said first portion and said second portion and said third portion being in axial alignment.

19. The rotary fluid distribution apparatus of claim 18, wherein said first portion and said third portion are synchronized by the connection of said second portion or by other electro-mechanical means, such that said first portion and said third portion are always offset by a fixed circumferential distance from each other during rotation of said first portion and said second portion and said third portion.

20. A rotary fluid distribution apparatus comprising:
a head having a wall extending around an interior volume thereof, said head having fixed fluid inlets and fixed fluid outlets;
a rotor extending through said interior volume, said rotor having an end surface adjacent said fixed fluid inlets and said fixed fluid outlets, said rotor comprising:
a plurality of fluid sections in a stacked configuration, a first fluid section of said plurality of fluid sections formed adjacent said end surface of said rotor, a second fluid section of said plurality of fluid sections formed adjacent said first fluid section opposite said end plate, a third fluid section of said plurality of fluid sections formed adjacent said second fluid section opposite said first fluid section;
a plurality of tunneling channels formed within said rotor, a first tunneling channel of said plurality of tunneling channels opening at a first end through said end surface to one of said fixed fluid inlets and said fixed fluid outlets and opening at a second end to said first fluid section of said plurality of fluid sections, a second tunneling channel of said plurality of tunneling channels opening at a first end through said end surface to another of said fixed fluid inlets and said fixed fluid outlets and opening at a second end to said second fluid section, a third tunneling channel of said plurality of tunneling channels opening at a first end through said end surface to yet another of said fixed fluid inlets and said fixed fluid outlets and opening at a second end to said third fluid section.

21. The rotary fluid distribution apparatus of claim 20, wherein said rotor is rotatable such that one of the tunneling channels opens to a different fixed fluid inlet or fixed fluid outlet.

* * * * *